United States Patent
Markwart (10) Patent No.: US 7,334,403 B2
(45) Date of Patent: Feb. 26, 2008

(54) BRAKE VALVE FOR A HYDRAULIC TRANSMISSION

(75) Inventor: Juergen Markwart, Nersingen (DE)

(73) Assignee: Brueninghaus Hydromatik GmbH, Elchingen (DE)

( * ) Notice: Subject to any disclaimer, the term of this patent is extended or adjusted under 35 U.S.C. 154(b) by 274 days.

(21) Appl. No.: 10/542,640

(22) PCT Filed: Dec. 19, 2003

(86) PCT No.: PCT/EP03/14615

§ 371 (c)(1),
(2), (4) Date: Jul. 19, 2005

(87) PCT Pub. No.: WO2004/068004

PCT Pub. Date: Aug. 12, 2004

(65) Prior Publication Data

US 2006/0112684 A1    Jun. 1, 2006

(30) Foreign Application Priority Data

Jan. 29, 2003 (DE) ................................. 103 03 487

(51) Int. Cl.
*F16D 31/02* (2006.01)
(52) U.S. Cl. .................................................... 60/460
(58) Field of Classification Search ............... 60/460, 60/466

See application file for complete search history.

(56) References Cited

U.S. PATENT DOCUMENTS

| | | | | |
|---|---|---|---|---|
| 4,720,975 A | * | 1/1988 | Gunter | 60/466 |
| 5,167,291 A | * | 12/1992 | Mann | 60/466 |
| 5,765,590 A | | 6/1998 | Kim et al. | |
| 6,038,859 A | * | 3/2000 | Mangano et al. | 60/436 |

FOREIGN PATENT DOCUMENTS

| | | |
|---|---|---|
| DE | 40 00 801 C1 | 2/1991 |
| DE | 41 19 333 C2 | 12/1992 |
| DE | 41 29 667 A1 | 3/1993 |

* cited by examiner

*Primary Examiner*—F. Daniel Lopez
(74) *Attorney, Agent, or Firm*—Scully, Scott, Murphy & Presser, P.C.

(57) ABSTRACT

The invention relates to control of a hydrostatic gearbox, comprising a hydraulic pump (2), provided for pumping in a first pump-side main line (5a) or a second pump-side main line (6a). The hydrostatic gearbox further comprises a hydraulic motor (3), connected to a first motor-side main line (5b) and a second motor-side main line (6b). The first pump-side main line (5a) and the second pump-side main line (6a) may be connected to the first motor-side main line (5b) or the second motor-side main line (6b) by means of a brake valve unit (19). The first motor-side main line (5b) or the second motor-side main line (6b), arranged downstream of the hydraulic motor (3), may be connected to a tank volume (12) in a throttled manner, depending on the pressure therein.

12 Claims, 6 Drawing Sheets

BRAKE VALVE FOR A HYDRAULIC TRANSMISSION

The invention relates to a control system for a hydrostatic transmission in an open circuit.

In an open circuit, a hydraulic pump draws in pressure medium from a tank volume and delivers it under pressure to a hydraulic motor via a main line. The hydraulic motor here serves, for example, to drive a vehicle, with the pressure medium which flows through the hydraulic motor flowing through a further main line, connected downstream to the hydraulic motor, back into the tank volume. If such a system is in overrun condition, the hydraulic motor starts to draw in pressure medium from the main line pressurised by the hydraulic pump and now acts, in turn, as a pump which delivers the pressure medium towards the tank volume.

In order to prevent, in such an arrangement, for example a vehicle driven by the hydrostatic transmission from getting into an unbraked driving condition, it is known for example from DE 41 29 667 A1 to use a brake valve through which the return flow from the hydraulic motor acting as a pump takes place in a throttled manner. During normal driving, the brake valve is brought into a switching position by the delivery pressure of the hydraulic pump counter to a spring force, in which position the pressure medium can return through the brake valve in an unthrottled manner. On changing to the overrun condition, the delivery pressure of the hydraulic pump falls considerably, so that the brake valve returns to its starting position. In this starting position, the main line arranged downstream of the hydraulic motor is connected to the tank volume via a throttling point.

The hydraulic motor, acting as a pump in the overrun condition, builds up a pressure in its main line situated downstream on account of this throttling point, thereby resulting in the intended braking action. The return of the brake valve to its neutral position, in which the downstream main line functioning as a return line is connected to the tank volume via a throttling point, takes place solely on account of two compression springs which bring the piston of the brake valve into a central position.

In order, in the event of a great pressure increase in the downstream main line, to prevent the pressure in the main line from exceeding a critical pressure, two pressure limiting valves are provided, via which the two main lines are short-circuited by the pressure when a threshold value is exceeded.

The system described has the disadvantage that the brake valve is brought into its central position by the force of the restoring springs and no control takes place during the braking process. In this central position, a certain throttling cross-section is fixed, and produces the braking action. The actuation of the brake valve takes place independently of the pressure conditions prevailing in the main lines on the side of the hydraulic motor, so that control with respect to the load of the hydraulic motor cannot take place.

A further disadvantage is that, in order to limit the pressure in the downstream main line, short-circuiting of the two main lines is carried out. Some of the pressure medium circulating in this case does not therefore flow through the tank volume and any additionally provided filters and coolers.

The object of the invention is to provide a control system for a hydrostatic transmission in an open circuit, in which a braking action is brought about in dependence on the pressure produced by the hydraulic motor in its downstream main line.

The object is achieved by the control system according to the invention having the features of claim 1.

According to the invention, a main line arranged downstream of the hydraulic motor is connected to a tank volume in the overrun condition by a brake valve unit. The connection takes place in a throttled manner, the throttling being dependent on how high the pressure is in the main line arranged downstream of the hydraulic motor. At a high pressure, i.e. with a strong pumping action of the hydraulic motor, only slight throttling takes place. Such slight throttling is accordingly felt merely as a small braking action, so that the sharp braking jolt which occurs with constant throttling is eliminated.

The subclaims relate to advantageous developments of the hydrostatic transmission according to the invention.

In this regard, it is particularly advantageous to design the brake valve unit such that, in addition to being subjected to the pressure prevailing in the motor-side main line arranged downstream of the hydraulic motor, it is also subjected to the delivery pressure of the hydraulic pump.

As a result, during normal driving, the motor-side main line arranged downstream of the hydraulic motor is likewise connected to the tank volume. By an appropriate choice of the measuring surfaces which are subjected to pressure, it is possible here, for normal driving, to enable a virtually unthrottled return of the pressure medium towards the tank volume.

Furthermore, it is particularly advantageous to provide a brake valve unit which has a rest position in which a flow of pressure medium coming from the hydraulic motor towards the tank volume is not possible. Through such a complete interruption of the possibility of flowing back, a vehicle standing on a slope, for example, is prevented from running off independently.

For a hydrostatic drive whose travelling direction valve has an idle position, it is furthermore particularly advantageous for both the main line upstream of the hydraulic motor and the main line downstream of the hydraulic motor to be connected to the tank volume in the idle position.

Preferred exemplary embodiments of the control system, according to the invention, for a hydrostatic transmission are illustrated in the drawing and explained in more detail by means of the following description. In the drawing.

Figure 1:
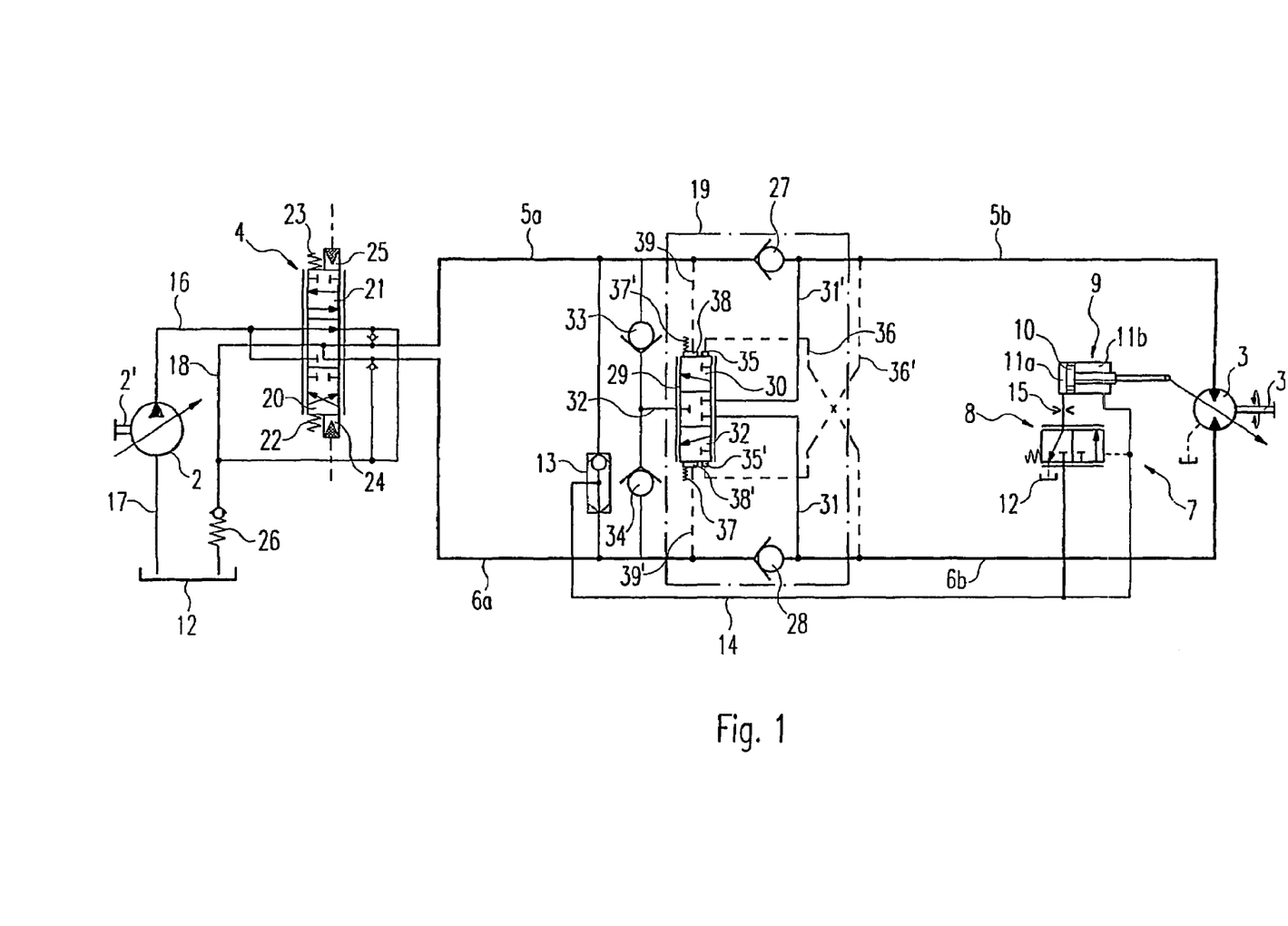
FIG. 1 shows a first exemplary embodiment of a circuit diagram of a control system according to the invention.

FIG. 1 shows a first exemplary embodiment of a circuit diagram of a control system, according to the invention, of a hydrostatic transmission 1. The hydrostatic transmission 1 comprises a hydraulic pump 2, which in the exemplary embodiment illustrated can be operated with an adjustable delivery volume. The pressure medium delivered by the hydraulic pump 2 drives a hydraulic motor 3, the absorbing volume of which is likewise adjustable.

To set the direction of rotation of the hydraulic motor 3, the hydraulic pump 2, which is designed for delivery in one direction only, is connected via a travelling direction valve 4 to a first pump-side main line 5a or a second pump-side main line 6a. Depending on the particular driving situation, the first pump-side main line 5a is connected to the first motor-side main line 5b. If the first pump-side main line 5a is connected via the travelling direction valve 4 to the hydraulic pump 2, as will be explained in detail later, the first pump-side main line 5a and, on top of that, also the first motor-side main line 5b are pressurised by the hydraulic pump 2. The pressure medium consequently drives the hydraulic motor 3 and flows, downstream of the hydraulic motor 3, back towards a tank volume 12 via the second motor-side main line 6b and the second pump-side main line 6a.

To adjust the variable absorbing volume of the hydraulic motor 3, there is provided an adjusting device 7 consisting essentially of a setting valve 8 and a setting unit 9. The setting unit 9 comprises a cylinder, in which there is arranged a setting piston 10 which divides the cylinder into a first pressure chamber 11a and a second pressure chamber 11b. Arranged between the first pump-side main line 5a and the second pump-side main line 6a is a shuttle valve 13, by means of which in each case the higher of the pressures prevailing in the pump-side main lines 5a, 6a is present in a setting pressure supply line 14. The setting pressure supply line 14 is connected to the second pressure chamber 11b. In addition, the setting pressure supply line 14 is connected to an inlet of the setting valve 8. When the pressure in the setting pressure supply line 14 increases, the inlet of the setting valve 8 is connected via a throttle 15 to the first pressure chamber 11a. If the pressures in the first pressure chamber 11a and the second pressure chamber 11b are equal, a resultant force acts on the setting piston 10, since the piston area in the first pressure chamber 11a is greater than in the second pressure chamber 11b.

By contrast, if the pressure in the setting pressure supply line 14 falls, the setting valve 8 is displaced in the opposite direction by the force of a compression spring which acts in the opposite direction to the pressure in the setting pressure supply line 14, the first pressure chamber 11a being increasingly connected to the tank volume 12. During normal operation, this means that, for example during the driving-off process, during which the pressure prevailing in the first pump-side main line 5a is greatly increased, the hydraulic motor 3 is displaced towards maximum absorbing volume and thus maximum torque. If the pressure in the first pump-side main line 5a is reduced by increasing speed of the vehicle after the driving-off process, the pressure in the setting pressure supply line 14 thus also falls. This decreasing pressure in the setting pressure supply line 14 brings about a movement of the setting valve 8 and thus relief of the first pressure chamber 11a to the tank volume 12, so that the hydraulic motor 3 is pivoted towards a smaller absorbing volume until a state of equilibrium is established.

The hydraulic pump 2 delivers the pressure medium to a pressure line 16, the pressure line 16 being connectable via the travelling direction valve 4 to the first pump-side main line 5a or the second pump-side main line 6a. To this end, starting from the rest position illustrated in FIG. 1, the travelling direction valve 4 can be switched to a first or second switching position 20 or 21, respectively. The rest position of the travelling direction valve 4 is governed by a first compression spring 22 and a second compression spring 23, which keep the travelling direction valve 4 in a central position. In order to connect the pressure line 16 to the corresponding pump-side main line 5a or 6a in accordance with the desired delivery direction, a first switching magnet 24 and a second switching magnet 25 are provided, respectively. For the subsequent explanations regarding the functioning of a brake valve unit 19 is discussed below, it is assumed that the travelling direction valve 4 is in its first switching position 20, in which the pressure line 16, into which the hydraulic pump 2 pumps the pressure medium drawn in from the tank volume 12 via a suction line 17, is connected to the first pump-side main line 5a.

Simultaneously, the second pump-side main line 6a is connected to a tank line 18 by the travelling direction valve 4 in the first switching position 20, which tank line connects the second pump-side main line 6a to the tank volume 12 via a spring-loaded check valve 26.

In the first exemplary embodiment illustrated in FIG. 1, the first pump-side main line 5a is connected to the first motor-side main line 5b by the brake valve unit 19 via a first check valve 27. The first check valve 27 is arranged such that it opens towards the hydraulic motor 3. Furthermore, a second check valve 28 is provided, which likewise opens towards the hydraulic motor 3 and which is therefore in its closed position for the delivery direction described, so that it is not possible for the pressure medium to flow back directly into the second pump-side main line 6a via the second motor-side main line 6b.

A possibility for the delivered pressure medium to flow back from the second motor-side main line 6b towards the tank volume 12 is provided via a brake valve 29. To this end, the brake valve 29 in a first end position 30 connects a first branch line 31 of the second motor-side main line 6b to a return connecting line 32. The return connecting line 32 is connected to the first pump-side main line 5a via a first return check valve 33 and to the second pump-side main line 6a via a second return check valve 34. The first return check valve 33 and the second return check valve 34 are each arranged such that they open towards the first pump-side main line 5a and the second pump-side main line 6a, respectively.

A first measuring surface 35 of the brake valve 29 is connected to the second motor-side main line 6b via a first brake pressure line 36. A hydraulic force, governed by the pressure prevailing in the second motor-side main line 6b, thus acts on the first measuring surface 35. The first measuring surface 35 is oriented such that the hydraulic force acting there deflects the brake valve 29 from its rest position towards the first end position 30 counter to the force of a first centring spring 37.

In addition, a second measuring surface 38, connected by a first pressure take-off line 39 to the first pump-side main line 5a, is formed on the brake valve 29. The first measuring surface 35 and the second measuring surface 38 are formed in the same direction on the brake valve 29, so that both the hydraulic force acting on the first measuring surface 35 and the hydraulic force acting on the larger second measuring surface 38 deflect the brake valve 29 towards its first end position 30. The transition between the rest position of the brake valve 29 and the first end position 30 is continuous here, so that the brake valve 29 forms an adjustable throttle in dependence on the pressure present at the first measuring surface 35 and the second measuring surface 38, respectively.

In the rest position of the brake valve 29, the connection between the first branch line 31 of the second motor-side main line 6b and the return connecting line 32 is completely broken, while in the first end position 30 of the brake valve 29, the connection from the first branch line 31 to the return connecting line 32 is virtually unthrottled.

In the described first switching position 20 of the travelling direction valve 4, during a normal driving situation in which a vehicle is accelerated or driven on the level via the hydrostatic transmission 1, the first pump-side main line 5a and the first motor-side main line 5b are pressurised and the hydraulic motor 3 is driven. By contrast, the second motor-side main line 6b, arranged downstream of the hydraulic motor 3, is relieved towards the tank volume 12 via the brake valve 29. To this end, the brake valve 29 is brought into its first end position 30, by the delivery pressure of the hydraulic pump 2 acting on the second measuring surface 38 via the first pressure take-off line 39, and thus connects the first branch line 31 to the return connecting line 32. Consequently, the second return check valve 34 opens and thus frees the flow path for the flowing-back pressure medium via the second pump-side main line 6a and the travelling direction valve 4, the tank line 18 and the spring-loaded check valve 26. The check valve 26 ensures that there is a low residual pressure in the line system here.

If a driving situation now occurs, for example when travelling downhill or braking, in which the vehicle is not driven by the hydraulic motor 3 but conversely the vehicle operates the hydraulic motor 3 in the sense of a pump, the pressure in the first pump-side main line 5a falls. With the pressure falling in the first pump-side main line 5a, the hydraulic force acting on the brake valve 29 at the second measuring surface 38 also falls simultaneously, so that the brake valve 29 is moved towards its rest position by the force of the first centring spring 37. Through the displacement of the brake valve 29 towards its rest position, the connection of the first branch line 31 to the return connecting line 32 is increasingly throttled. This increasing throttling offers an ever-increasing flow resistance to the flowing-back pressure medium, which consequently leads to an increase of the pressure in the second motor-side main line 6b, situated downstream of the hydraulic motor 3.

This pressure, which increases with increasing throttling, in the second motor-side main line 6b travels, via the first brake pressure line 36, to the first measuring surface 35 and acts there, once again, counter to the first centring spring 37. Since the area of the first measuring surface 35 is smaller than the area of the second measuring surface 38, only a throttled connection is opened between the first branch line 31 and the return connecting line 32.

As a result of this throttled connection, the hydraulic motor 3 operated as a pump has to perform work to convey the pressure medium towards the tank volume 12, thereby achieving the desired braking action.

Since the throttling carried out in the brake valve 29 is dependent on the level of the pressure present at the first measuring surface 35, not only is an improvement in comfort during braking achieved, but also the use of additional pressure limiting valves is unnecessary. If need be, they may be used additionally for safety reasons. This function is likewise already performed by the brake valve 29, since with rising pressure in the second motor-side main line 6b, situated downstream of the hydraulic motor 3, a greater through-flow cross-section through the brake valve 29 is freed.

Moreover, appropriate dimensioning of the spring rate of the first centring spring 37 and the size of the first measuring surface 35 makes it possible for the connection between the first branch line 31 and the return connecting line 32 to be completely broken, as long as a certain threshold value for the pressure in the second motor-side main line 6b is not exceeded. This makes it possible, for example, to park the vehicle on a slope, so that it cannot start moving by itself, in contrast to a fixed throttle, since the hydraulic motor 3 working as a pump is blocked on account of the line interruption.

The above explanations regarding a flow direction from the first pump-side main line 5a via the first motor-side main line 5b through the hydraulic motor 3 and back via the second motor-side main line 6b and the second pump-side main line 6a to the tank volume 12 apply analogously also to a reverse delivery direction, as occurs on reversal of the travelling direction. The travelling direction valve 4 is brought here into its second switching position 21 by the second switching magnet 25. In this case, during normal driving, the pressure medium flows towards the hydraulic motor 3 via the second check valve 28, a third measuring surface 38' of the brake valve 29 being subjected to a hydraulic force counter to a second centring spring 37' via the second pressure take-off line 39'. Through the resultant deflection of the brake valve 29, a second branch line 31' of the first motor-side main line 5b is connected to the return connecting line 32 if the brake valve 29 is in its second end position 32. The connection is virtually unthrottled.

If the vehicle gets into overrun condition, in the delivery direction described last, a fourth measuring surface 35' of the brake valve 29, which is smaller than the third measuring surface 38', is subjected to the correspondingly increased pressure in the first motor-side main line 5b, now situated downstream of the hydraulic pump 3, so that the brake valve 29 once again frees a throttled cross-section towards the tank volume 12, via which the pressure medium returns from the first motor-side main line 5b via the second branch line 31'. To subject the fourth measuring surface 35' to a pressure, the first motor-side main line 5b is connected to the fourth measuring surface 35' via a second brake pressure line 36'.

Figure 2:
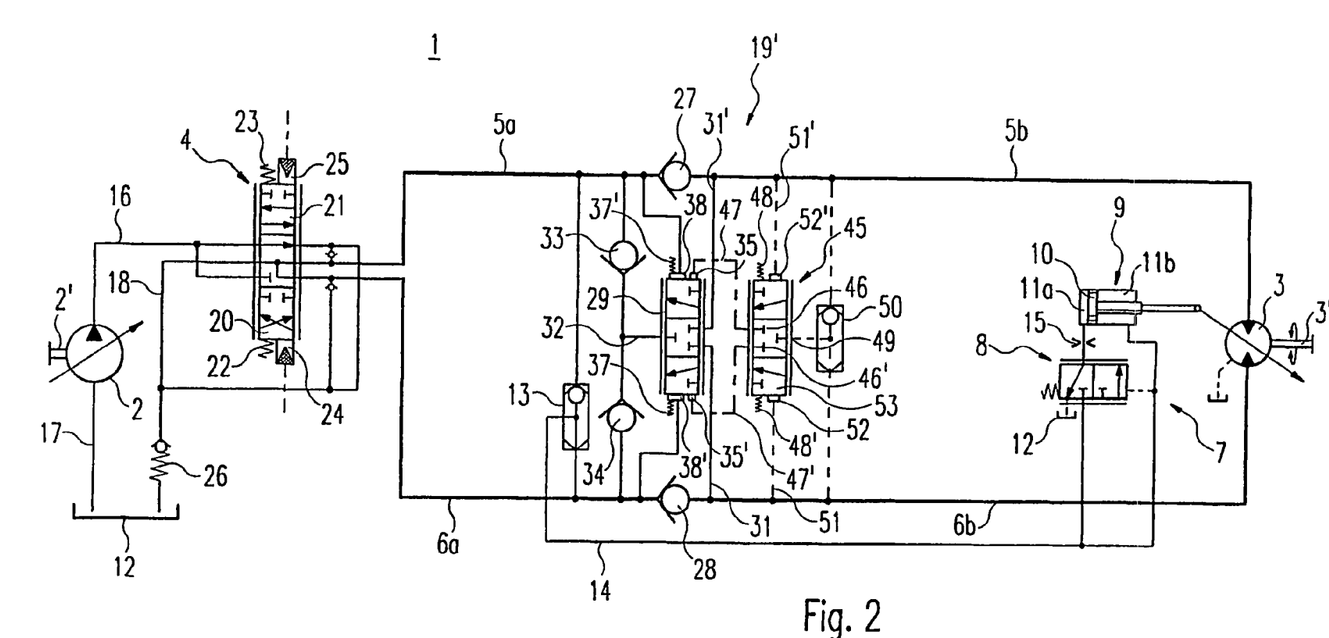
FIG. 2 shows a second exemplary embodiment of a circuit diagram of a control system according to the invention.

FIG. 2 illustrates a further exemplary embodiment with an alternative design of a brake valve unit 19'. The construction of the hydrostatic transmission 1 corresponds essentially to the construction of the hydrostatic transmission illustrated in FIG. 1, so that identical elements are provided with the same reference symbols. In contrast to the embodiment explained in FIG. 1, however, the brake valve 29 is not directly subjected to a pressure at its first measuring surface 35 and its fourth measuring surface 35' from the second motor-side main line 6b and the first motor-side main line 5b, respectively. To control the pressure prevailing at the first measuring surface 35 and the fourth measuring surface 35', use is made here of a pilot control valve 45 having a first outlet 46, which is connected to the first measuring surface 35 via a first brake pressure line section 47. A second outlet 46' of the pilot control valve 45 is connected to the fourth measuring surface 35' via a second brake pressure line section 47'.

The pilot control valve 45 is kept by two restoring springs 48, 48' in its rest position, in which the first and second outlet 46 and 46' are separated from an inlet 49 of the pilot control valve 45. The inlet 49 of the pilot control valve 45 is connected to the first motor-side main line 5b and the second motor-side main line 6b via a shuttle valve 50, so that in each case the higher of the pressures of the first motor-side main line 5b and the second motor-side main line 6b prevails at the inlet 49.

If the travelling direction valve 4 is in its first switching position 20, the driven vehicle being in overrun condition, then, as has already been explained with reference to FIG. 1, the first check valve 27 is open on account of the delivery pressure of the hydraulic pump 2, whereas the second check valve 28 is closed. Owing to the overrun condition and the hydraulic motor 3 therefore acting as a pump, the pressure in the second motor-side main line 6b rises and the shuttle valve 50 is in its position illustrated in FIG. 2. The increased pressure of the second motor-side main line 6b therefore acts on the inlet 49 of the pilot control valve 45.

Simultaneously, via a first brake pressure measuring line section 51, a first brake pressure measuring surface 52 of the pilot control valve 45 is subjected to a hydraulic force corresponding to the pressure prevailing in the second motor-side main line 6b, so that the pilot control valve 45 is deflected from its rest position towards a first control position 53. In dependence on the hydraulic force at the first brake pressure measuring surface 52 and the opposite force of the first restoring spring 48, the pilot control valve 45 continuously opens a through-flow connection from the inlet 49 to the first outlet 46. When the pilot control valve 45 reaches its first control position 53, the connection is fully open, so that the pressure of the second motor-side main line 6b is present at the first measuring surface 35 of the brake valve 29.

The pilot control valve 45 is, once again, symmetrically constructed, so that it functions analogously in the reverse flow direction. To this end, a second brake pressure measuring surface 52', which is connected to the first motor-side main line 5b via a second brake pressure measuring line section 51', is formed on the pilot control valve 45. If, in the opposite flow direction, the pressure in the first motor-side main line 5b exceeds the pressure in the second motor-side main line 6b, the inlet 49 of the pilot control valve 45 is connected to the first motor-side main line 5b via the shuttle valve 50.

The functioning and construction of the brake valve 29 is identical to the functioning and construction of the brake valve 29 from FIG. 1. However, by using the pilot control valve 45, it is possible to influence the brake pressure present at the measuring surfaces 35 and 35'. In particular, the time characteristic can advantageously be adapted to the particular use conditions of the vehicle and to the vehicle itself.

Figure 2A:
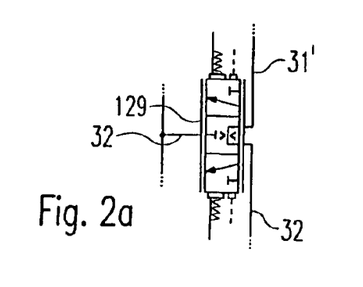
FIG. 2a shows a modified brake valve.

Instead of the brake valve 29 as described in the exemplary embodiments of FIG. 1 and FIG. 2, a modified brake valve 129 may also be used with particular advantage in both exemplary embodiments. The modified brake valve 129 is illustrated in FIG. 2a. If the modified brake valve 129 is in its rest position, the first branch line 31 is connected in a throttled manner to the second branch line 31'. Through the throttled connection, the control stability of the system is improved.

Figure 3:
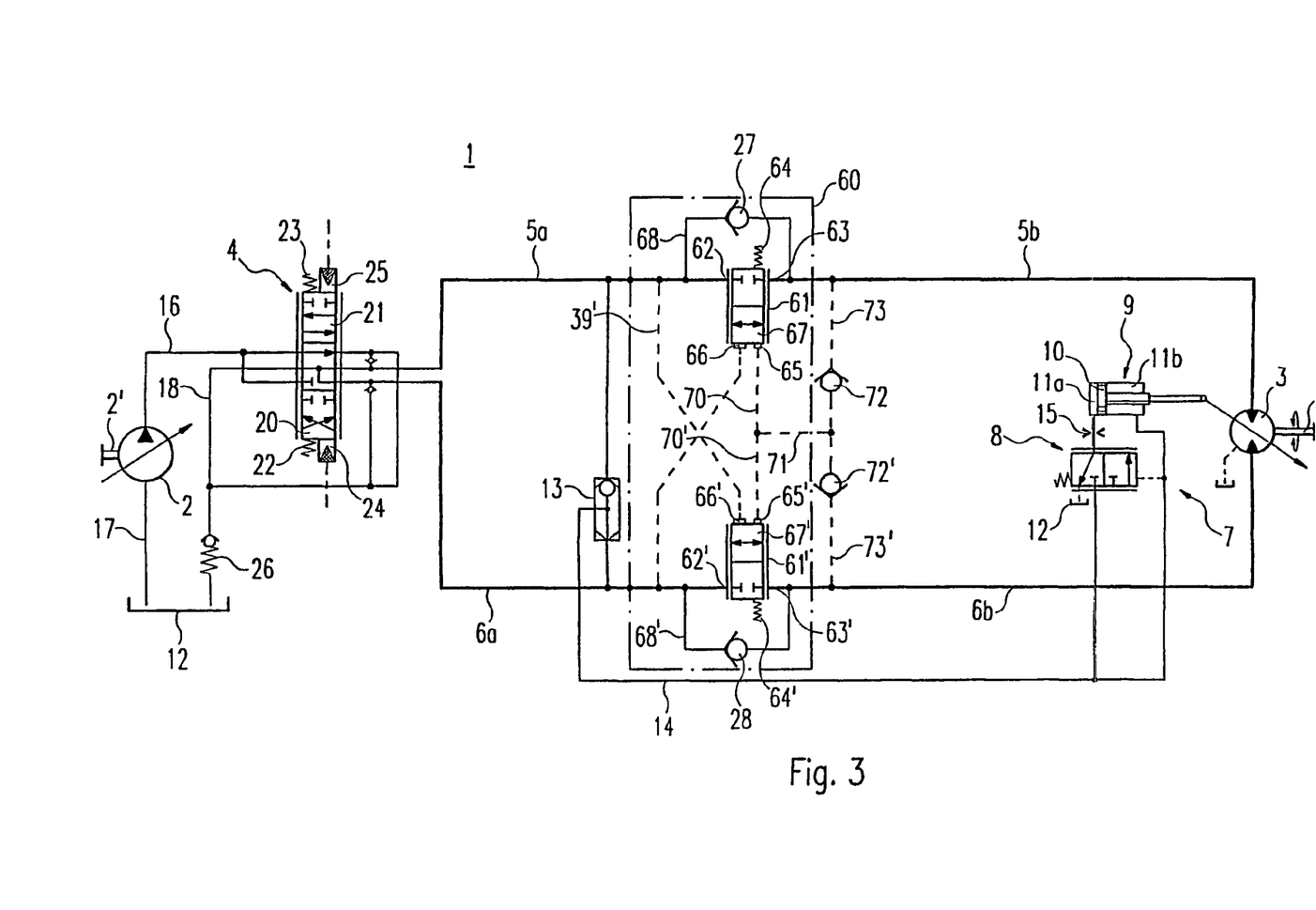
FIG. 3 shows a third exemplary embodiment of a circuit diagram of a control system according to the invention.

A further embodiment of the control system according to the invention is illustrated in the hydraulic circuit diagram of FIG. 3. A brake valve unit 60 provided therein consists essentially of a first brake valve 61 and a second brake valve 61'. The following explanations which refer merely to the first brake valve 61 apply analogously also to the second brake valve 61', reference symbols which correspond to each other being used as apostrophised reference symbols in connection with the second brake valve 61'.

The first brake valve 61 has a first connection 62 and a second connection 63, which have no through-flow connection in the rest position of the first brake valve 61. The first brake valve 61 is kept in the rest position by a spring 64 as long as there is no pressure, deflecting the brake valve 61 from its rest position towards an end position 67 counter to the force of the spring 64, present at its first measuring surface 65 or its larger second measuring surface 66. The first pump-side main line 5a is connected to the first motor-side main line 5b via a first check valve 27, arranged in a bypass line 68. If the travelling direction valve 4 is in its first switching position 20 as already explained, the first pump-side main line 5a is pressurised by the hydraulic pump 2, the pressure travelling to the first motor-side main line 5b via the bypass line 68 and the first check valve 27, which opens towards the hydraulic motor 3.

The pressure prevailing in the first pump-side main line 5a acts on the second measuring surface 66' of the second brake valve 61', for which purpose the second measuring surface 66' of the second brake valve 61' is connected to the first motor-side main line 5a via a third pressure take-off line 39'. The delivery pressure of the hydraulic pump 2 acting on the second measuring surface 66' of the second brake valve 61' deflects the valve from its rest position towards its end position 67' counter to the force of the spring 64'.

In the end position 67' of the second brake valve 61', the second motor-side main line 6b is connected to the second pump-side main line 6a and, despite the closed second check valve 28 of the bypass line 68', it is still possible for the pressure medium delivered by the hydraulic motor 3 to flow back towards the tank volume 12.

If, on account of a braking process, the hydrostatic transmission 1 gets into overrun condition, where the hydraulic motor 3 acts as a pump, the pressure in the first pump-side main line 5a falls. Accordingly, greater throttling takes place through the second brake valve 61', which is displaced towards its rest position by the spring 64' counter to the decreasing hydraulic force acting on the second measuring surface 66'. The greater throttling simultaneously brings about a pressure rise in the second motor-side main line 6b. The increased pressure in the second motor-side main line 6b is transmitted to the first measuring surface 65' of the second brake valve 61' via a brake line section 70'. To this end, the brake line section 70' is connected via a connecting line 71 to a take-off line 73', in which check valve 72' opening towards the second brake valve 61' is arranged. The simultaneous change of the pressures present at the measuring surfaces is used particularly advantageously to enable gentle initiation of the braking process. To this end, the ratios of the surfaces and the spring rate of the oppositely acting spring are matched to one another in all the brake valves used.

The hydraulic force thus acting on the first measuring surface 65' of the second brake valve 61' deflects the brake valve 61' from its rest position towards the end position 67', so that a throttled connection is established between the second motor-side main line 6b and the second pump-side main line 6a. The pumping hydraulic motor 3 performs work at the throttling point, the intensity of the throttling being dependent on the pressure prevailing in the second motor-side main line 6b. An excessive rise of the pressure in the second motor-side main line 6b is prevented, since a pressure increase also brings about an increase of the hydraulic force at the first measuring surface 65' of the brake valve 61' and consequently the flow cross-section is enlarged.

Figure 4:
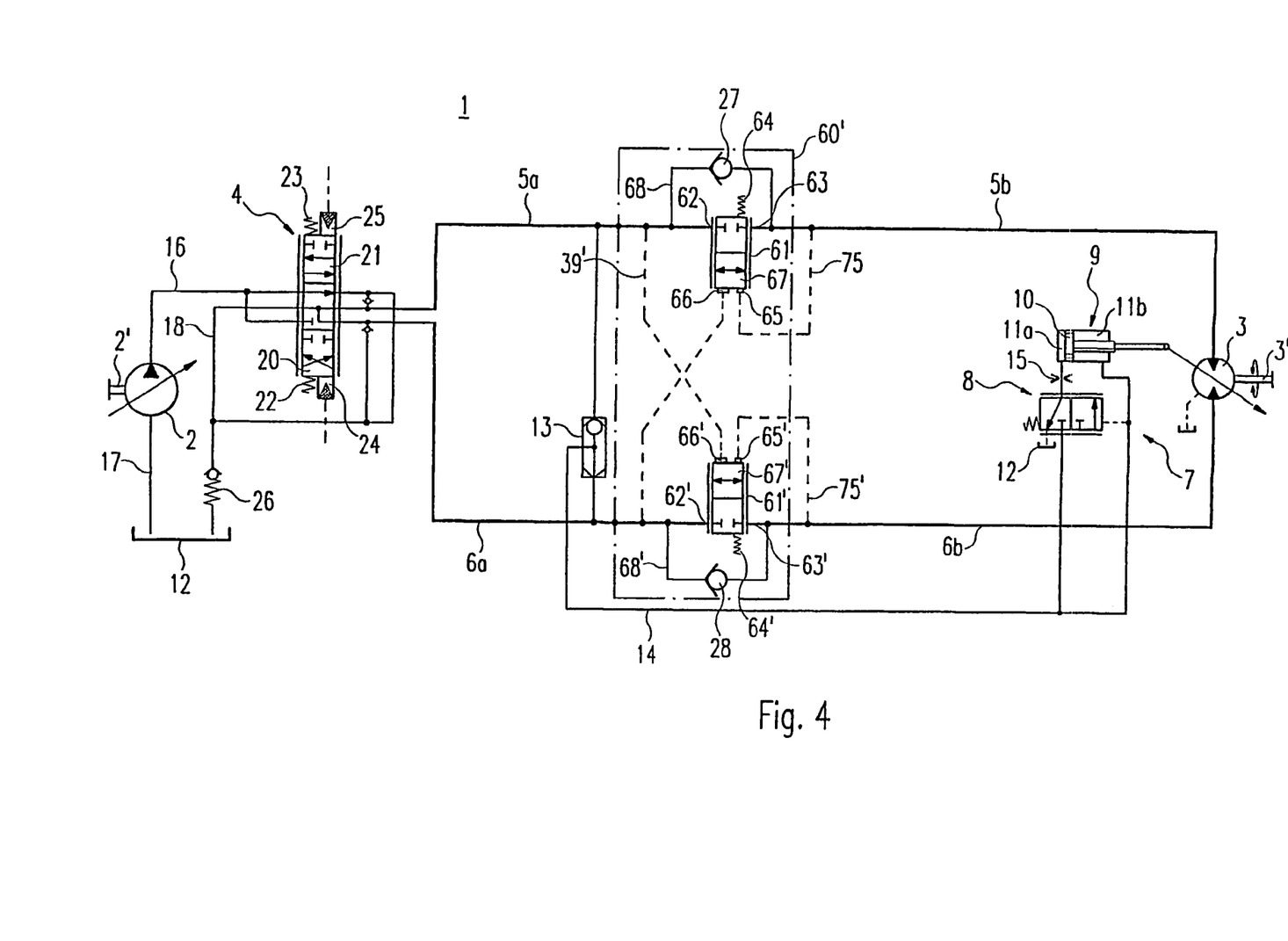
FIG. 4 shows a fourth exemplary embodiment of a circuit diagram of a control system according to the invention.

FIG. 4 illustrates a similar exemplary embodiment in which a first brake valve 61 and a second brake valve 61' are provided. In contrast to the exemplary embodiment of FIG. 3, however, the first measuring surfaces 65 and 65' are in this case not connected to the first and second motor-side main line 5b and 6b, respectively, via check valves. Instead, the first measuring surface 65 is directly connected to the first motor-side main line 5b via a connecting line 75 and the first measuring surface 65' of the second brake valve 61' is directly connected to the second motor-side main line 6b via a second connecting line 75'.

Figure 5:
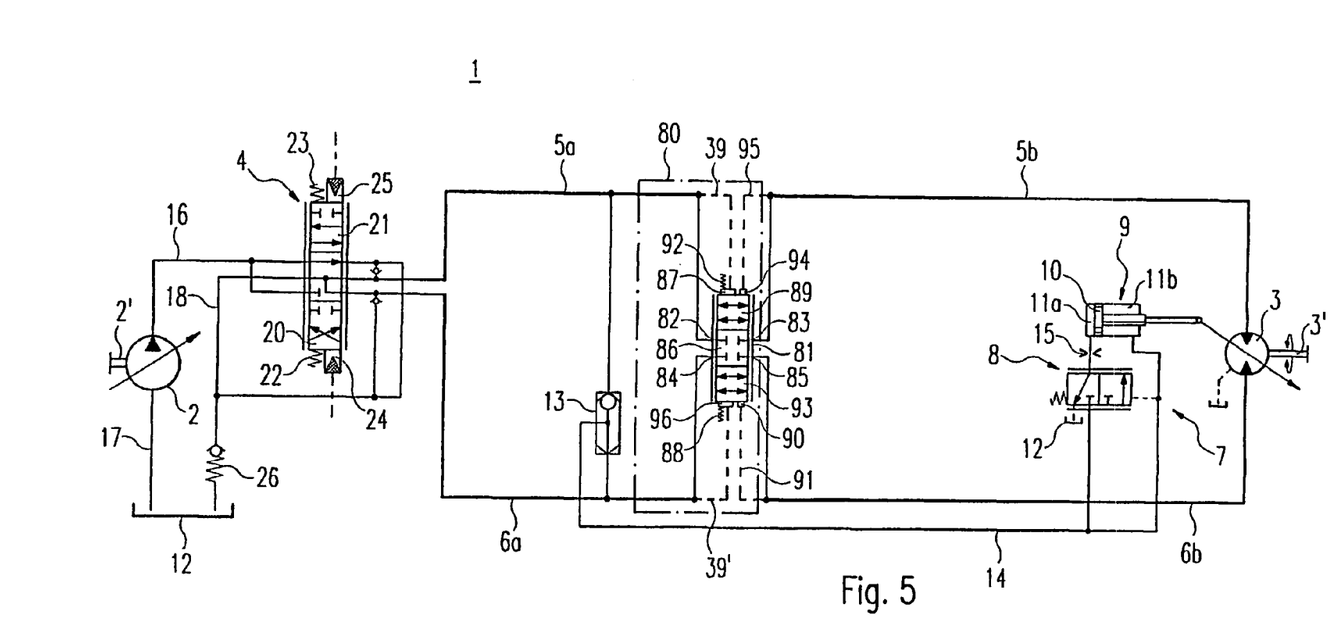
FIG. 5 shows a fifth exemplary embodiment of a circuit diagram of a control system, according to the invention, of a hydrostatic transmission.

A hydraulic circuit diagram for a fifth exemplary embodiment of the control system according to the invention is illustrated in FIG. 5. In this embodiment, the brake valve unit 80 comprises a brake valve 81. The brake valve 81 has a first connection 82, to which the first pump-side main line 5a is connected. A second connection 83 of the brake valve 81 is connected to the first motor-side main line 5b. Correspondingly, a third connection 84 and a fourth connection 85 are connected to the second pump-side main line 6a and the second motor-side main line 6b, respectively. If the brake valve 81 is in its central position 86, the connections 82 to 85 have no connection through the brake valve 81.

If the first pump-side main line 5a is pressurised by the hydraulic pump 2 and the travelling direction valve 4, the delivery pressure of the hydraulic pump 2 is transmitted to a second measuring surface 87 via the pressure take-off line 39. The force acting there deflects the brake valve 81 towards a first end position 89 counter to the force of the compression spring 88. In dependence on the resultant force of the compression spring 88 and the oppositely directed hydraulic force, the brake valve 81 can assume any intermediate position. As with the other brake valves of the exemplary embodiments of FIGS. 1 to 4, a continuous adjustment of the throttling is thus possible.

In a normal driving situation, in which, for example, the first pump-side main line 5a is pressurised by the hydraulic pump 2, thus once again both the first pump-side main line 5a is connected to the first motor-side main line 5b and the second motor-side main line 6b is connected to the second pump-side main line 6a, the brake valve 81 being deflected as far as its end position 89 on account of the force acting on the larger second measuring surface 87, in which position throttling is negligible.

If, now, once again a reversal of the pressure in the main lines takes place as a result of the pumping action of the hydraulic motor 3, the pressure acting on the second measuring surface 87 decreases and the pressure acting on a first measuring surface 90 is increased. The first measuring surface 90 is, to this end, connected to the second motor-side main line 6b via a connecting line 91. The hydraulic force acting on the first measuring surface 90 acts counter to a further compression spring 92 and displaces the brake valve 81 towards its second end position 93.

In the second end position of the brake valve 81, likewise the first motor-side main line 5b is connected to the first pump-side main line 5a and the second motor-side main line 6b is connected to the second pump-side main line 6a. On account of the surface ratios of the second measuring surface 87 and the first measuring surface 90, the deflection towards the second end position 93 on reversal of the pressure is less, so that only a throttled connection is produced between the second motor-side main line 6b and the second pump-side main line 6a, and this connection causes the desired braking action.

To produce a braking action on reversal of the flow direction in the hydraulic circuit, a smaller measuring surface 94, having the same orientation as the second measuring surface 87 and connected to the first motor-side main line 5b via a further connecting line 95, is provided. In order to move the brake valve 81 towards its second end position 93 when the first pump-side main line 6a is pressurised by the hydraulic pump 2, a third measuring surface 96, pressurised with pressure medium via a second pressure take-off line 39' from the second pump-side main line 6a, is provided.

Figure 5A:
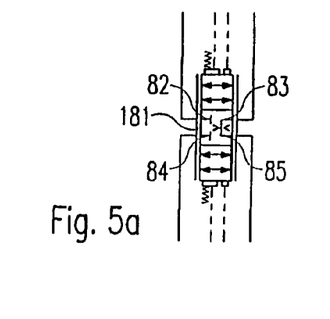
FIG. 5a shows a modified brake valve of the exemplary embodiment of FIG. 5.

FIG. 5a shows once again a modified brake valve 181, which can be employed in the exemplary embodiment of FIG. 5 instead of the brake valve 81. In the modified brake valve 181, the second connection 83 and the fourth connection 85 are connected to one another in a throttled manner in the rest position of the brake valve 181. The throttled connection here brings about an improvement of the control stability.

The invention also embraces possible combinations of the hydraulic circuit diagrams illustrated in the individual exemplary embodiments in FIGS. 1 to 5. In particular, for all designs of the brake valve unit, it is conceivable for the respectively smaller measuring surfaces to be acted upon via a pilot control valve. The pressure medium flow returned to the tank volume 12 is preferably directed via a cooler (not illustrated), which ensures that the pressure medium does not heat up to a critical temperature even at great braking power. The drive (illustrated in the figures) of the hydraulic pump 2 is effected by means of a drive motor (not illustrated) via a drive shaft 2'. A downstream-connected mechanical transmission, for example, of a vehicle to be driven may be connected to a drive shaft 3' of the hydraulic motor 3.

Figure 6:
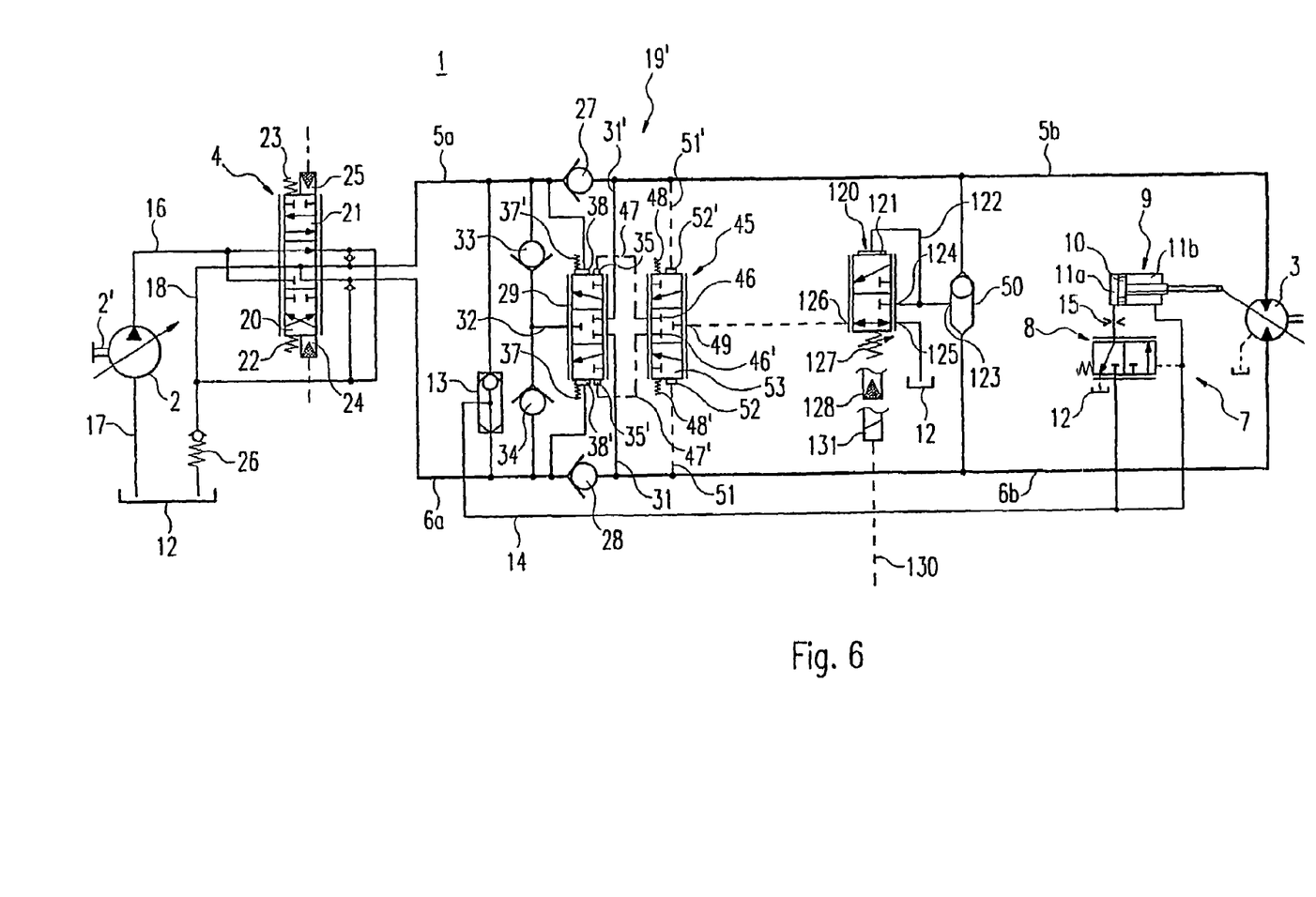
FIG. 6 shows a sixth exemplary embodiment of a circuit diagram of a control system according to the invention.

The exemplary embodiment illustrated in FIG. 6 is based on the exemplary embodiment of FIG. 2, already explained in detail. In order to achieve increased flexibility with regard to the braking power to be set, the inlet 49 of the pilot control valve 45 is now not directly connected to the shuttle valve 50. Instead, a brake pressure control valve 120 is arranged between the shuttle valve 50 and the inlet 49 of the pilot control valve 45.

The brake pressure control valve 120 is a 3/2-way valve. A hydraulic force acts on a measuring surface 121 of the brake pressure control valve 120 towards its first end position. The measuring surface 121 of the brake pressure control valve 120 is connected to an outlet 123 of the shuttle valve 50 via a measuring line 122. Furthermore, a first inlet 124 of the brake pressure control valve 120 is likewise connected to the outlet 123 of the shuttle valve 50. By contrast, a second inlet 125 is connected to the tank volume 12.

The brake pressure control valve 120 additionally has an outlet 126, which is connected to the inlet 49 of the pilot control valve 45. In dependence on the forces acting on the brake pressure control valve 120, a control position of the brake pressure control valve 120 occurs when the forces are in equilibrium. The brake pressure control valve 120 here can assume any positions between the first end position, in which the first inlet 124 is connected to the outlet 126, and the second end position, in which the second inlet 125 is connected to the outlet 126. While a hydraulic force proportional to the higher pressure prevailing in the first motor-side main line 5b or in the second motor-side main line 6b always acts on the measuring surface 121 of the brake pressure control valve 120, the force acting oppositely on the brake pressure control valve 120 may be adjusted. Thus, the pressure acting on the inlet 49 of the pilot control valve 45 is continuously adjustable between the pressure of the tank volume 12 and the higher of the pressures prevailing in the motor-side main lines 5b and 6b.

The brake pressure control valve 120 is subjected to the hydraulic force at the measuring surface 121 of the brake pressure control valve 120 such that the outlet 126 is increasingly connected to the first inlet 124. In the simplest case, the force of an adjusting spring 127 acts in the opposite direction. If, by contrast, the pressure acting on the inlet 49 of the pilot control valve 45 is to be adjustable in a particularly flexible manner during operation, the force directed opposite the hydraulic force at the measuring surface 121 of the brake pressure control valve 120 is produced either hydraulically at a second measuring surface 128 of the brake pressure control valve 120 or electrically, for example by means of a proportional magnet 131.

As a result of the brake pressure control valve 120, the pressure present at the inlet 49 of the pilot control valve 45 is reduced as compared with a direct connection of the inlet 49 to the shuttle valve 50. Through this reduction of the pressure, the force acting on the first measuring surface 35 or the fourth measuring surface 35' of the brake valve 29 is also reduced. A reduction of the force acting on the measuring surfaces 35 and 35' results in an increase of the braking power, since, as already explained in the exemplary embodiment in FIG. 1 and FIG. 2, with increasing pressure on the first measuring surface 35 or the fourth measuring surface 35' of the brake valve 29, the throttling action of the brake valve 29 is reduced, and vice versa.

Via the brake pressure control valve 120, the braking power can thus be increased by supplying, either to the second measuring surface 128 or the proportional magnet 131, via a corresponding signal line 130, either a corresponding control pressure or else an electrical control signal. This control pressure or the control signal may, for example, be dependent on the actuation of a brake pedal (not illustrated) or else on an inclination detected by an inclination sensor. When using an inclination sensor, the brake pressure control valve 120 is preferably adjusted via a proportional magnet 131 with the aid of an electrical signal produced by the inclination sensor.

A further application possibility arises when using a 2-speed transmission. In this case, for example during the changing process, the control pressure used to change a transmission step may be employed to produce an adapted brake pressure by means of the brake pressure control valve 120.

The advantage of the exemplary embodiment according to FIG. 6 lies in the possibility of continuously varying the braking power and thus taking account of the particular driving situation.

The invention claimed is:

1. A control system for a hydrostatic transmission in an open circuit comprising a hydraulic pump, provided for delivery to a first pump-side main line or a second pump-side main line, and a hydraulic motor, connected to a first motor-side main line and second motor-side main line, and comprising a brake valve unit, via which the first pump-side main line is connectable to the first motor-side main line and the second pump-side main line is connectable to the second motor-side main line, wherein the first motor-side main line or second motor-side main line, situated downstream of the hydraulic motor, is connectable to a tank volume in a throttled manner by means of the brake valve unit in dependence on the pressure prevailing in said lines, the brake valve unit comprising a brake valve with a first measuring surface, and the brake valve is subjected to a brake pressure at the first measuring surface counter to a spring force, which pressure is dependent on the pressure prevailing in the first motor-side main line or second motor-side main line, situated downstream of the hydraulic motor, a pilot control valve that is connected on the outlet side to the first measuring surface of the brake valve, being provided to produce the brake pressure, and wherein the pilot control valve is connected on the inlet side, via a shuttle valve, to the first motor-side main line or second motor-side main line, respectively.

2. A control system for a hydrostatic transmission in an open circuit comprising a hydraulic pump, provided for delivery to a first pump-side main line or a second pump-side main line, and a hydraulic motor, connected to a first motor-side main line and second motor-side main line, and comprising a brake valve unit, via which the first pump-side main line is connectable to the first motor-side main line and the second pump-side main line is connectable to the second motor-side main line, wherein the first motor-side main line or second motor-side main line, situated downstream of the hydraulic motor, is connectable to a tank volume in a throttled manner by means of the brake valve unit in dependence on the pressure prevailing in said lines, and wherein in a rest position of the brake valve unit, the first motor-side main line is connected to a throttled manner to the second motor-side main line.

3. A control system for a hydrostatic transmission in an open circuit comprising a hydraulic pump, provided for delivery to a first pump-side main line or a second pump-side main line, and a hydraulic motor, connected to a first motor-side main line and second motor-side main line, and comprising a brake valve unit, via which the first pump-side main line is connectable to the first motor-side main line and the second pump-side main line is connectable to the second motor-side main line, wherein the first motor-side main line or second motor-side main line, situated downstream of the hydraulic motor, is connectable to a tank volume in a throttled manner by means of the brake valve unit in dependence on the pressure prevailing in said lines, wherein the brake value unit comprising a brake valve with a first measuring surface, and the brake valve is subjected to a brake pressure at the first measuring surface counter to a spring force, which pressure is dependent on the pressure prevailing in the first motor-side main line or second motor-side main line, situated downstream of the hydraulic motor, a pilot valve that is connected on the outlet side to the first measuring surface of the brake valve being provided to produce the brake pressure, and wherein the pressure present at the pilot control valve on the inlet side is controllable via a brake pressure control valve.

4. The control system according to any one of claims 1, 2 or 3, wherein the pilot control valve for controlling the brake pressure is subjected to the pressure prevailing in the first motor-side main line or second motor-side main line, situated downstream of the hydraulic motor.

5. The control system according to any one of claims 1, 2 or 3, wherein the brake valve has a second measuring surface, which acts on the brake valve in the same direction as the first measuring surface and which is subjected to a hydrostatic force from the first pump-side main line or second pump-side main line, situated upstream of the hydraulic motor.

6. The control system according to any one of claims 1, 2 or 3, herein the hydraulic pump can be connected to the first pump-side main line or the second pump-side main line via a traveling direction valve.

7. The control system according to claim 6, wherein for operation of the hydrostatic transmission with changing flow direction, the brake valve unit is symmetrically constructed.

8. The control system according to claim 6, wherein the connection to the tank volume takes place via the traveling direction valve.

9. The control system according to claim 8, wherein the traveling direction valve has a rest position in which the first pump-side main line and the second pump-side main line are connected to the tank volume.

10. The control system according to any one of claims 1, 2 or 3, wherein the first pump-side main line and the first motor-side main line and/or the second pump-side main line and the second motor-side main line are connected to one another each by a check valve which opens towards the hydraulic motor.

11. The control system according to any one of claims 1, 2 or 3, wherein in a rest position of the brake valve unit, the flow path from the first motor-side main line towards the first pump-side main line and from the second motor-side main line towards the second pump-side main line, respectively, is interrupted.

12. The control system according to any one of claims 1 or 3, wherein in a rest position of the brake valve unit, the first motor-side main line is connected in a throttled manner to the second motor-side man line.

* * * * *